No. 870,189. PATENTED NOV. 5, 1907.
J. N. MAHONEY.
BRAKE FOR POWER DRIVEN VEHICLES.
APPLICATION FILED OCT. 30, 1905.
4 SHEETS—SHEET 1.
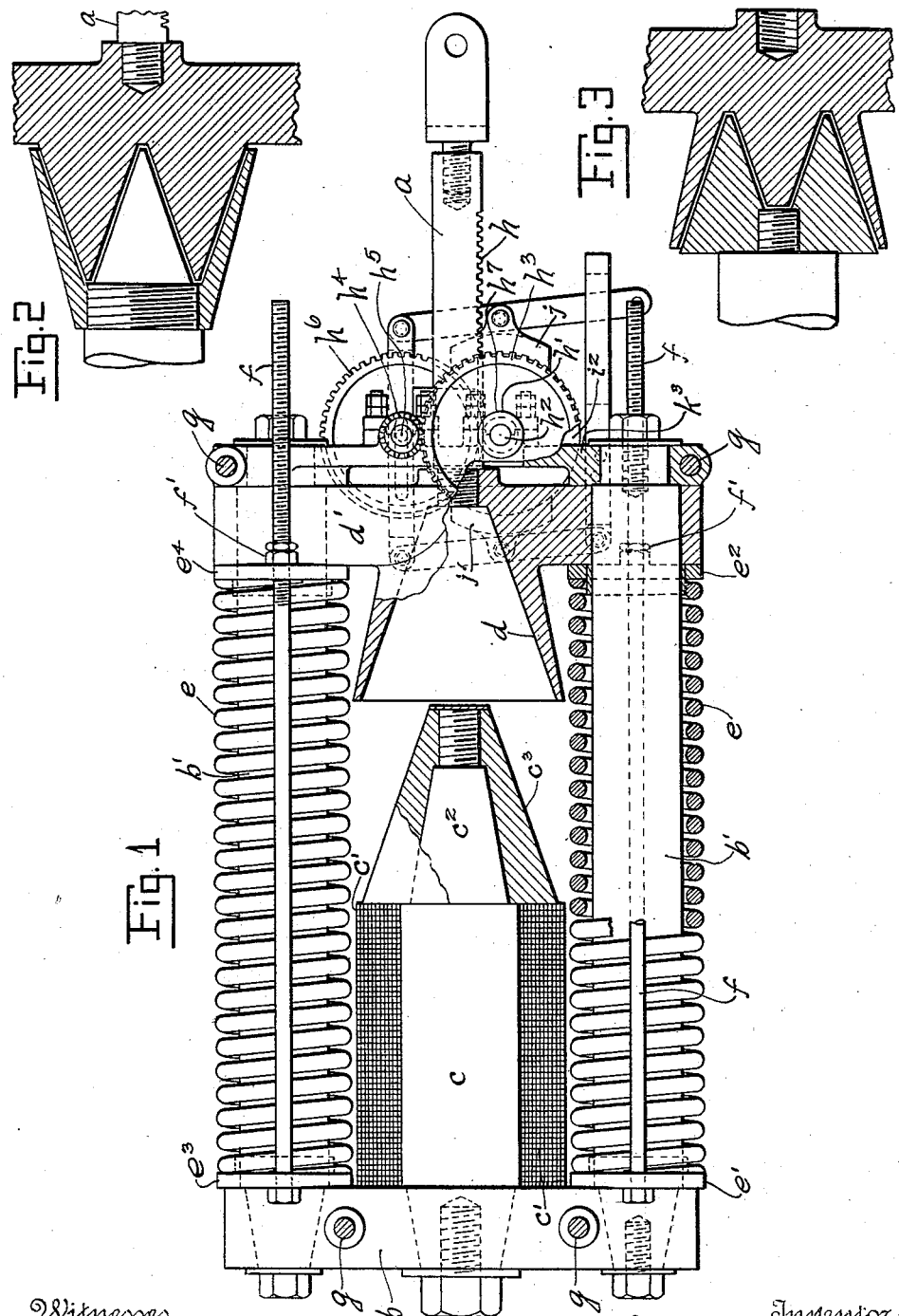

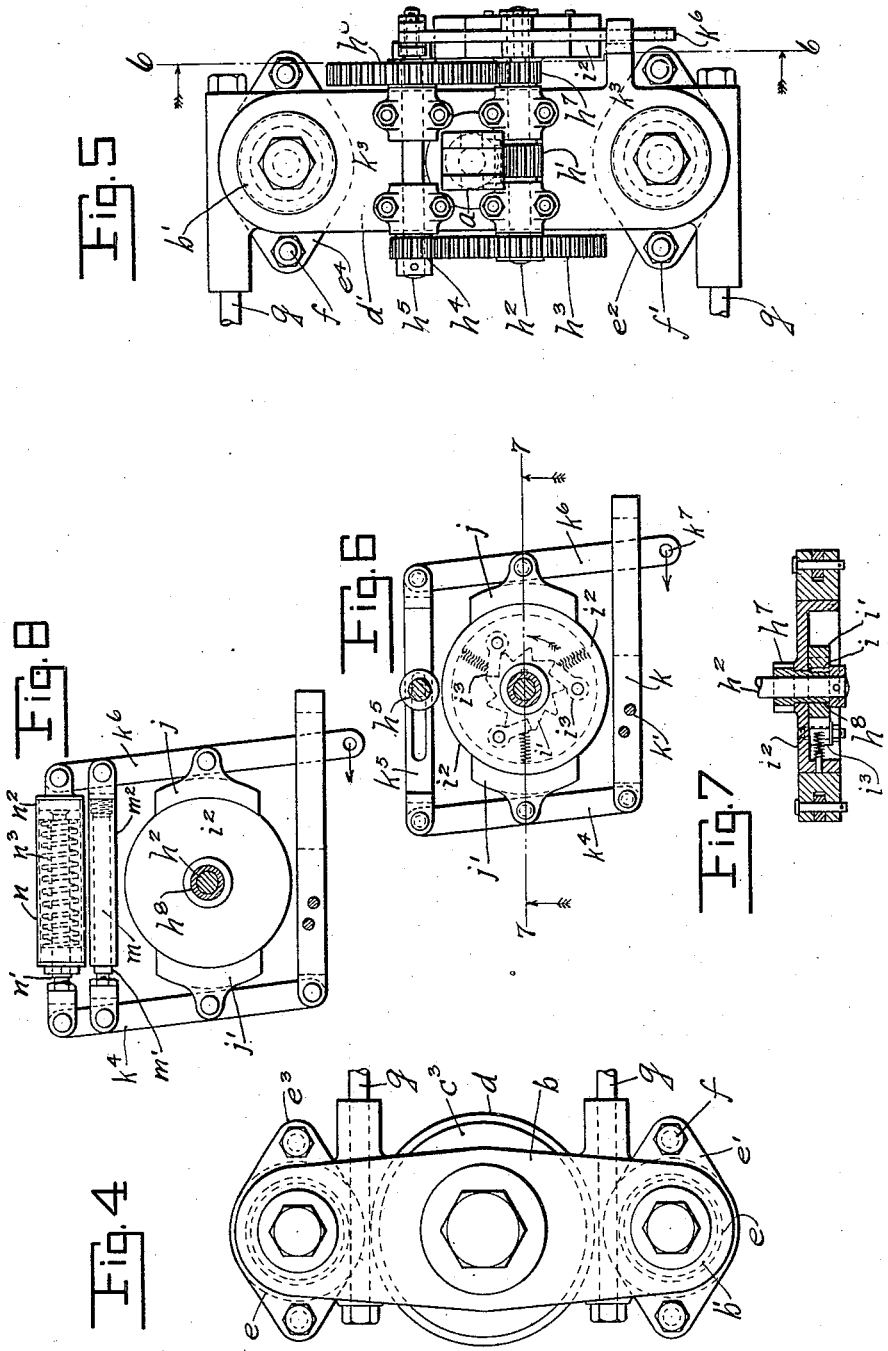

No. 870,189. PATENTED NOV. 5, 1907.
J. N. MAHONEY.
BRAKE FOR POWER DRIVEN VEHICLES.
APPLICATION FILED OCT. 30, 1905.
4 SHEETS—SHEET 3.
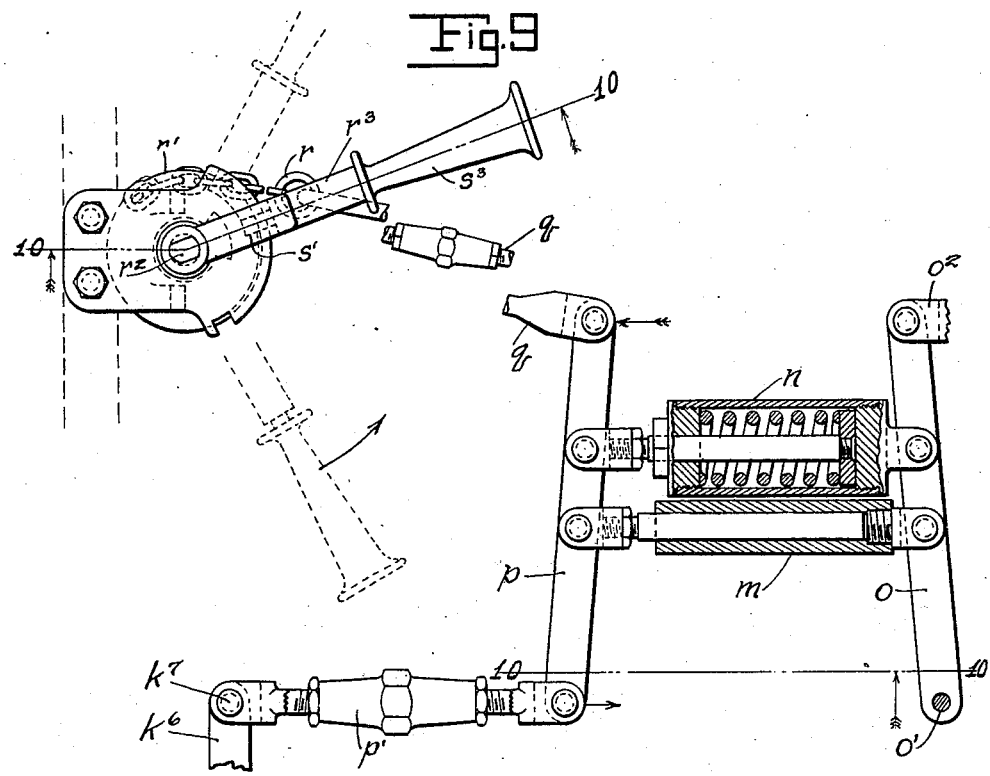
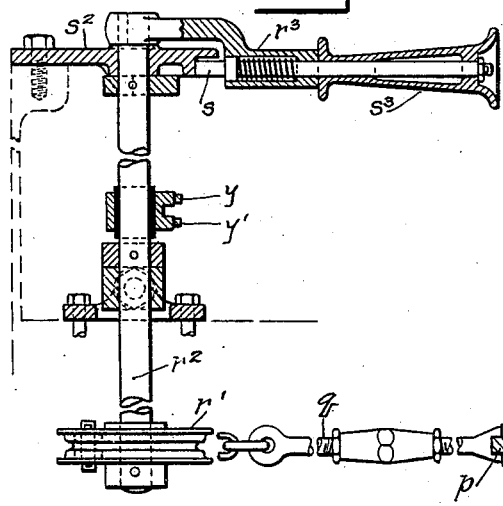
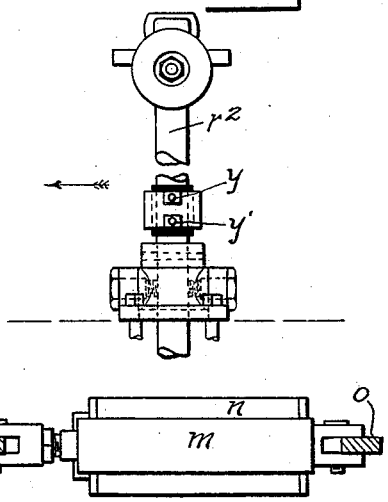
Witnesses
Inventor
Joseph N. Mahoney
By his Attorney No. 870,189. PATENTED NOV. 5, 1907.
J. N. MAHONEY.
BRAKE FOR POWER DRIVEN VEHICLES.
APPLICATION FILED OCT. 30, 1905.
4 SHEETS—SHEET 4.
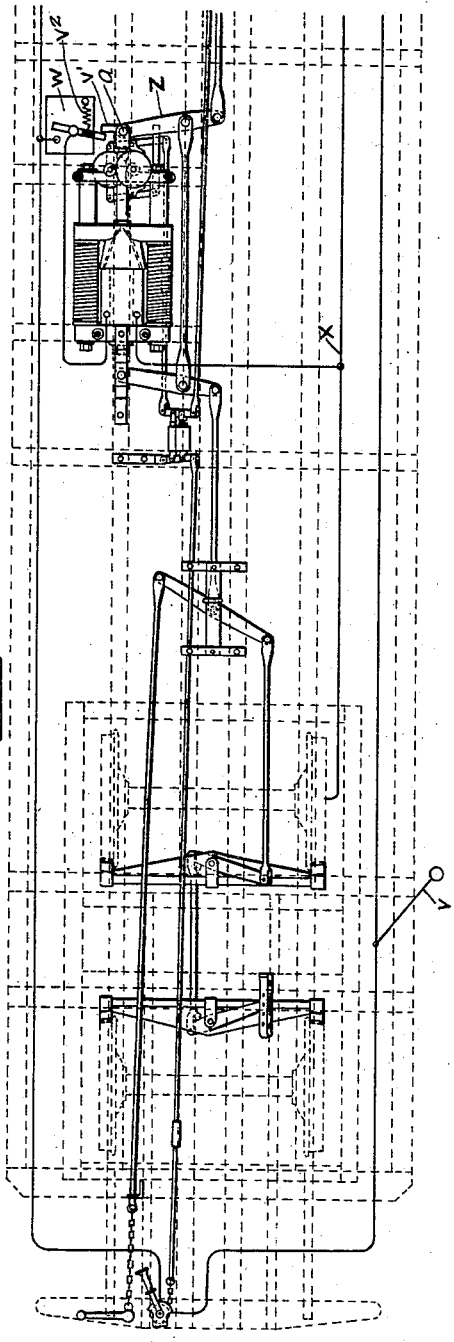
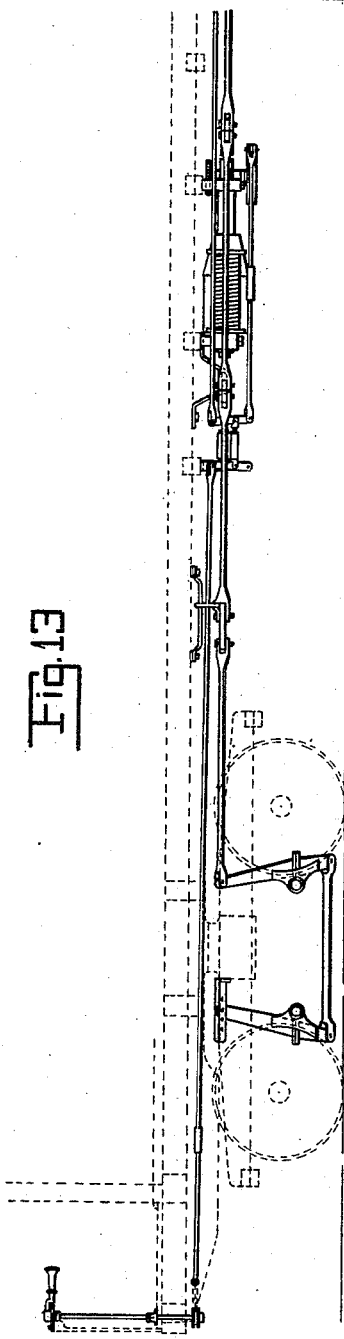

UNITED STATES PATENT OFFICE.

JOSEPH N. MAHONEY, OF BROOKLYN, NEW YORK, ASSIGNOR TO HIMSELF, AND JAMES D. LEYS AND SAMUEL JACOBSON, OF NEW YORK, N. Y.

BRAKE FOR POWER-DRIVEN VEHICLES.

No. 870,189.　　　　　Specification of Letters Patent.　　　　　Patented Nov. 5, 1907.

Application filed October 30, 1905. Serial No. 284,986.

*To all whom it may concern:*

Be it known that I, JOSEPH NATHANIEL MAHONEY, a citizen of the United States of America, residing in the borough of Brooklyn, county of Kings, State of New York, have invented certain new and useful Improvements in Brakes for Power-Driven Vehicles, of which the following is a specification.

This invention relates to the general class of vehicle brakes disclosed in my U. S. application, No. 263,417, filed June 2, 1905. Such brakes comprise a spring under tension the reaction of which applies the brake shoes. An electric motor subjects the spring to further partial or complete tension to throw the brakes partially or completely out of operation. Means are provided for locking or retaining the springs under such further tension and for gradually relieving the tension to apply the brakes with varying pressures. The locking or retaining means are so constructed and arranged that they normally act to hold increments of increased tension imposed upon the brake spring by the motor, irrespective of opening or closing of the motor circuit; and are controllable at will, to partially or completely relieve the spring of its increased tension and thereby permit of a variable braking operation under the control of the motorman. The motor acts when energized to relieve the brake pressure, and the retaining devices are controlled to apply the brakes gradually or abruptly at will. In the present invention, the means for retaining such further compression of the brake spring to hold the brake shoes out of operation and to gradually relieve the tension to permit application of the shoes at varying pressures is entirely mechanical and under the direct convenient control of the motorman, and is especially applicable to single vehicles or cars.

In the accompanying drawings: Figure 1 is a plan view partly in section showing brake applying springs, the electric motor or magnet subjecting them to further compression and the retaining devices: Fig. 2, a detail longitudinal section through the pole pieces of such a magnet differing in construction from that shown in Fig. 1. Fig. 3, a similar view showing a further modification of the pole pieces. Fig. 4, an elevation of one end of the brake operating apparatus: Fig. 5, an elevation of the opposite end: Fig. 6, a cross section on line 6, 6, of Fig. 5, showing devices for retaining and relieving the added tension imposed on the brake spring by the motor. Fig. 7, a cross section on the line 7, 7, of Fig. 6: Fig. 8, a detail view showing a modification of the retaining devices: Fig. 9, a view on a larger scale showing a brake controller and a system of levers for controlling the retaining devices, the arrangement being different from that indicated in Fig. 8: Fig. 10, a section on lines 10, 10, of Fig. 9. Fig. 11, a detail elevation taken at right angles to Fig. 10: Fig. 12, a bottom plan view indicating, in dotted lines, a car to which the brake apparatus is shown applied: Fig. 13, shows the same parts in side elevation.

The car indicated in dotted lines in Figs. 12 and 13, is assumed to be an ordinary electrically-propelled car, the driving motor being omitted, deriving current from an overhead or underground conductor or third rail, or otherwise. The system of brake shoes and levers indicated in Figs. 12 and 13 need no special description. These parts may be arranged as indicated or any other appropriate organization may be employed. The electric motor illustrated is in the form of an electro magnet of special construction, hereinafter described, having a pole piece reciprocating in a straight line and to which is connected a draw bar $a$ jointed to the primary brake lever $z$. The electrical terminals or contacts controlling the circuit including the winding of this motor are indicated by $y$, $y'$, Figs. 10 and 11, and as illustrated, the closing and opening of the circuit is controlled directly at the shaft of the brake controller. Such controlling contacts, however, may be otherwise located and appropriately controlled.

Referring to Figs. 1, 4 and 5, the motor comprises a solid, stationary rear yoke or cross-head $b$ of magnetic metal to which are securely bolted parallel posts $b'$ between which, and also securely bolted to the yoke is the core $c$, the winding of which is indicated by $c'$. The pole piece of this core is in the form of a truncated cone, the maximum diameter of which is materially larger than that of the core. It is shown in this instance as being composed of the reduced tapered threaded ends $c^2$ of the core over which is fitted the conical piece $c^3$. The opposite pole piece $d$ is formed with a socket corresponding to, and within which fits, the pole piece $c^3$. The hollow pole piece $d$, as shown is formed integrally with a movable cross-head $d'$ of magnetic metal which is slidably fitted upon the posts $b'$. The brake springs $e$ envelop the posts $b'$ and are located between washer plates $e'$, $e^2$, $e^3$, $e^4$ between the tops and bottoms of which respectively extend threaded bolts $f$ having nuts $f'$ applied to their threaded ends outside of the washer plates $e^2$, $e^4$. By running up these nuts, the initial brake operating compression is imparted to the springs. When the magnet is energized, the pole piece $d$ is attracted thereby, subjecting the brake springs to further compression or tension and pulling the brake shoes out of operative engagement with the vehicle wheels.

$g$, $g$, $g$, $g$, represents the bolts by which the motor is suspended from the car body or truck.

When the magnet is energized and the pole piece $d$ and draw bar $a$ attracted, the rack $h$ formed upon the draw bar drives a pinion $h'$ on a shaft $h^2$ carrying a gear $h^3$ meshing with a pinion $h^4$ on a counter shaft $h^5$ carrying a gear $h^6$ meshing with a pinion $h^7$ on a sleeve $h^8$ on the shaft $h^2$. Secured to this sleeve by a key $i$ is a ratchet wheel $i'$; and loosely mounted upon the sleeve is a brake wheel or disk $i^2$ carrying spring actuating pawls $i^3$. Assuming that the brake disk is held against rotation, the ratchet wheel will, when the motor or magnet is energized, turn in the direction indicated by the arrow, Fig. 6, in contact with the spring pawls, and will be held in the position to which it is rotated, by the pawls when the motor or magnet is deënergized.

In the organization illustrated, the brake disk is locked or frictionally held by friction shoes $j$, $j'$ in the following manner. Referring to Figs. 5 and 6, $k$ is a heavy bar pinned by bolts $k'$ to the end frame piece $k^3$ of the magnet or motor. To one end of this bar is jointed a link $k^4$ intermediate the ends of which is pivoted a friction shoe $j'$ and to the end of which is jointed one end of a link $k^5$, the opposite end of which is jointed to a lever $k^6$ intermediate the ends of which is pivoted the oppositely disposed friction shoe $j$ and the end of which extends through a slot in the arm $k$ and is formed with an aperture $k^7$ for attachment of a chain or rod. The link $k^5$ is slotted and has limited endwise movement upon an extension of shaft $h^5$ upon which it is hung. The motorman by strain upon the lever $k^6$ in the direction indicated by the arrow may draw the opposite disposed friction shoes $j$, $j'$ against the brake disk $i^2$ to lock it as already stated. This strain may be effected by means of an ordinary brake staff and chain which may also control contacts for completing and opening the circuit of the winding $c'$ of the brake motor magnet.

Fig. 8 shows a modification of this arrangement in which the link $k^5$ is replaced by two connections between the ends of the levers $k^4$, $k^6$. One of these connections $m$ is composed of a rod $m'$ jointed to lever $k^4$ and telescoping in a tube or sleeve $m^2$ jointed to lever $k^6$. Outside of this connection is disposed the connection $n$ composed of a headed rod $n'$ jointed to a lever $k^4$ and a cylinder $n^2$ jointed to lever $k^6$. Around the rod and within the cylinder and between a head on the rod and the end of the cylinder through which the rod passes is disposed a coiled spring $n^3$. These parts are so arranged and proportioned that when no strain is applied to the lever $k^6$, the reaction of spring $n^3$ draws together the ends of levers $k^4$, $k^6$ and when the rod $m'$ bears upon the bottom of the sleeve in which it telescopes, the levers fulcrum upon their connections with the rod and sleeve respectively and the friction shoes are by the tension of the spring lifted out of engagement with the disk $i'$. When, however, a strain is applied upon lever $k^6$ it and lever $k^4$ fulcrum upon the points of connection with the rod and sleeve, the tension of the spring $n^3$ is overcome and the friction shoes are brought into contact with the disk. Further strain on lever $k^6$ now acts to press the shoes with greater force against the disk, the telescoping spring connection $m$ permitting any further movement of levers $k^4$, $k^6$ increasing to desired extent the compression of spring $n^3$ which holds the friction shoes upon the disk. This arrangement permits of a variation of pressure of the shoes upon the disk due to the reaction of the spring, made variable by the large range of movement of the levers, and consequently any desired pressure may be obtained of the shoes upon the disk, under complete control of the motorman. The spring connection $m$, under these conditions performs the function of a yielding spring fulcrum, the work done by the levers being applied at the points of contact between the disk $i^2$ and the friction shoes $j$, $j'$. By this arrangement, therefore, the motorman may impose any desired friction shoe pressure upon the disk and relieve it to any extent that he may desire to permit gradual application of the brake shoes to vary the operation of braking the vehicle at his option. This is deemed to be a material improvement in operation over the more elementary design shown in Fig. 6.

Without the intervention of other devices, the arrangement of Figs. 6 and 8 are adapted more particularly to control from one end of the car only. In Fig. 9, however, I have shown an adaptation of the spring and telescoping connections $m$, $n$, in connection with an arrangement such as shown in Fig. 6 whereby control of the braking operation may be conveniently effected from either end of the car, retaining all the advantages incident to the construction in Fig. 8. In Fig. 9 there are two substantially parallel levers $o$, $p$. Lever $o$ is pivoted at one end upon a fixed axis $o'$. Its opposite end has jointed to it a rod or link connection $o^2$ leading to a brake controller not shown at one end of the car. Intermediate the ends of the lever $o$ are jointed the telescoping member $m$ and spring member $n$ constructed and designed to operate exactly as already described in Fig. 8, and connected and jointed at their opposite ends to a lever $p$ one end of which is jointed to the end of a link or coupling $p'$ equipped with an adjusting turn buckle and whose opposite end is jointed at $k^7$ to lever $k^6$ shown in Fig. 6. The opposite end of lever $p$ has connected to it a link or coupling $q$ equipped with an ordinary turn buckle and to the end of which is applied a chain $r$ attached to the drum or chain wheel $r'$ of the brake controller staff $r^2$. $r^3$ is the operating handle removably applied as usual to the staff $r^2$. When this handle is thrown in the direction indicated by the arrow, the chain is wound upon the chain wheel and a strain, in the direction of the arrow, imparted to the end lever $p$. The handle when so turned into running position but not carried to its maximum or brake-release position in which the electric motor circuit is closed at contacts $y$, $y'$, may be held by a spring bolt $s$ adapted to engage a shoulder $s'$ on a casting $s^2$ in which the staff has its upper bearing. This lock may be relieved by outward strain upon the sliding grip operation $s^3$ of the handle. When the chain is so wound up, the operation of the parts $m$, $n$, in connection with the structure indicated in Fig. 6 is obviously the same as has already been described in connection with Fig. 8. These devices, of course, are all duplicated in connection with the link $o^2$ applied to the end lever $o$ for effecting a similar control of the braking operation at the opposite end of the car. In operation of this brake, the handle of the controller is carried to its release or extreme position, closing the circuit contacts $y$, $y'$ of the motor which acts to further compress the brake springs and pull the brake shoes out of action in which position they are held by the retaining devices when the controller handle is moved back to the running position in which it may be held by the latch $s$. To apply the brakes, this latch is tripped and by manipulation of the handle, the friction shoe pressure upon the disk $i$ may be varied to permit such gradual release of the further tension imposed upon the brake spring by the motor as may be deemed desirable by the motorman for effecting a quick or gradual stop of the vehicle. The brakes may be gradually relieved by manipulation of the handle to and from brake-release position, that is, to and from one in which the circuit of the motor is closed to effect compression of the brake spring. In that way pressure between the braking surfaces may be readily controlled by the motorman, any compression of the brake spring being held, as already described, by the retaining devices.

The arrangement of friction shoes and levers with the temporary or shifting fulcrum $m$ and the yielding spring fulcrum $n$, is not dependent upon the mechanical control of the friction shoes, nor upon the special form of apparatus with which such parts are associated in this application.

The purpose of the designs of pole pieces illustrated in Figs. 1, 2 and 3 is to give a relatively great active magnetic air gap surface area as compared with the cross sectional area of the metal inclosed within the winding. This characteristic construction of a motor or tractive magnet forms the subject matter of another application filed by me July 1, 1905, Serial No. 267,915.

The circuit of the motor is from the trolley $v$ through contacts $y$, $y'$ at the brake staff to a two-point switch $w$ thence to the motor and ground at $x$. A projection $v'$ on the draw-bar $a$ opens the switch when maximum tension has been imposed upon the brake spring. A spring $v^2$ applied to the arm of the switch automatically closes the switch on reduction of such maximum tension.

I claim as my invention:

1. In vehicle brake mechanism, the combination of a brake spring under tension tending to apply the brakes, a motor acting to impose further tension upon the spring to partially or wholly hold the brakes out of operation, retaining devices automatically acting while the motor is energized and after its circuit is opened to retain any such further tension of the spring, means for automatically opening the circuit of the motor when the brakes have been drawn to release position, a brake staff and operative mechanical connections between the staff and the retaining devices whereby the latter may be operated to abruptly or gradually release the increased tension of the spring to effect abrupt or variable application of the brakes.

2. In vehicle brake mechanism, the combination of a brake spring under tension tending to apply the brakes, an electric motor acting to impart further tension to the spring to partially or entirely hold the brakes out of operation, retaining devices automatically acting throughout the time the circuit of the motor is closed to retain any such further tension of the spring, a device under manual control of the motorman, means controlled thereby acting to deënergize the motor and operative mechanical connections between said device and the retaining devices whereby the latter may be operated to abruptly or gradually release the increased tension of the spring to effect abrupt or variable application of the brakes.

3. In vehicle brake mechanism, the combination of a brake spring under tension tending to apply the brakes, an electric motor acting to impose further tension upon the spring and partially or entirely hold the brakes out of operation, retaining devices adapted to retain the spring under any such further tension or release it at will of the motorman, and a manually controlled device acting when moved to brake release position to first set the retaining devices so as to retain further tension imparted to the spring and then close the circuit of the motor to effect such further tension of the spring.

4. In vehicle brake mechanism, the combination of a brake spring under tension tending to apply the brakes, an electric motor acting to impose further tension upon the spring and partially or entirely hold the brakes out of operation, retaining devices comprising a part free to move in one direction, as the action of the motor imposes further tension upon the brake spring, and adapted to be held against movement in the opposite direction to thereby retain the spring under such further tension, said retaining devices comprising friction devices for so holding said part, a device under control of the motorman, an operative mechanical connection between it and the friction devices, the motor circuit and its circuit controlling contacts, the parts being so organized that when the device under control of the motorman is moved to brake release position said friction holding devices are brought into operation and the circuit of the motor then closed.

5. In vehicle brake mechanism, the combination of a brake spring under tension tending to apply the brakes, a motor acting to impose further tension upon the spring to relieve the brakes, spring tension retaining devices comprising a friction shoe for locking said retaining devices to retain the increased tension of the spring, a lever upon which the shoe is mounted, a yielding spring-fulcrum for the lever, and means for at will applying power to the lever to bring the friction shoe into operation.

6. The vehicle brake mechanism, the combination of a brake spring under tension tending to apply the brakes, a motor acting to impose further tension upon the spring to relieve the brakes, spring tension retaining devices comprising oppositely disposed friction shoes and an interposed part upon which they operate to lock said retaining devices, levers upon which the friction shoes are mounted, a yielding spring fulcrum interposed between the levers, and means for at will applying power to the levers to yieldingly force the friction shoes against said interposed part, the force of such application of the friction shoes being regulated by the extent of movement of the levers.

7. In vehicle brake apparatus, the combination with a brake spring under tension tending to apply the brakes, and a motor acting to impose further tension upon the spring and partially or wholly hold the brakes out of operation, of spring pressure retaining devices acting to controllably retain the spring under any such further tension, and comprising a brake spring pressure retaining disk, oppositely disposed friction shoes acting thereon, levers upon which such shoes are mounted, the telescoping connection $m$ and the spring connection $n$ interposed between the levers and acting substantially as described.

8. In vehicle brake apparatus the combination of disk $i^2$, oppositely disposed friction shoes acting thereon, levers upon which the friction shoes are mounted, and temporarily acting and yielding spring fulcrums both interposed between levers and operating substantially as described.

9. In vehicle brake mechanism, the combination of a brake spring under tension tending to apply the brakes, an electric motor acting to impose further tension upon the spring and partially or entirely hold the brakes out of operation, retaining devices adapted to retain the spring under any such further tension or release it at will of the motorman, and a manually controlled device acting when moved to brake release position to first set the retaining devices so as to retain further tension imparted to the spring and then close the circuit of the motor to effect such further tension of the spring and means acting automatically to open the circuit of the motor when maximum tension has been imposed upon the spring and close such break in the circuit on reduction of such maximum tension.

10. In vehicle brake mechanism, the combination of a brake spring under tension tending to apply the brakes, a motor acting to impose further tension upon the spring to partially or wholly hold the brakes out of operation, retaining devices automatically acting while the motor is energized and after its circuit is opened to retain any such further tension of the spring, a brake staff and operative mechanical connections between the staff and the retaining devices whereby when the staff is moved to release the brakes the retaining devices are first set to retain increased tension of the spring and then the circuit of the motor is closed, and on partial reverse movement the motor circuit is opened and on further reverse movement the retaining devices may be controlled to permit desired application of the brakes.

11. In a vehicle brake mechanism, the combination of a brake spring under tension tending to apply the brakes, a motor acting to impose further tension upon the spring to partially or wholly hold the brakes out of operation, retaining devices automatically acting while the motor is energized and after its circuit is opened to retain any such further tension of the spring, a brake staff and operative mechanical connections between the staff and the retaining devices whereby when the staff is moved to release the brakes the retaining devices are first set to retain increased tension of the spring and then the circuit of the motor is closed, and on partial reverse movement the motor circuit is opened and on further reverse movement the retaining devices may be controlled to permit desired application of the brakes and means independent of the controller automatically acting to open the circuit of the motor when desired maximum tension has been imposed upon the spring and to close such break on reduction of such maximum tension.

In testimony whereof, I have hereunto subscribed my name.

JOSEPH N. MAHONEY.

Witnesses:
EDWARD C. DAVIDSON,
KATHARINE MACMAHON.